United States Patent [19]
Zimmer

[11] 4,290,239
[45] Sep. 22, 1981

[54] TOOL POSITIONER

[75] Inventor: Ernst Zimmer, Friedberg, Fed. Rep. of Germany

[73] Assignee: Industriewerke Karlsruhe Augsburg AG Zweigniederlassung Keller & Knappich, Augsburg, Fed. Rep. of Germany

[21] Appl. No.: 119,628

[22] Filed: Feb. 7, 1980

[30] Foreign Application Priority Data

Feb. 15, 1979 [DE] Fed. Rep. of Germany ....... 2905784
Dec. 21, 1979 [DE] Fed. Rep. of Germany ....... 2951832

[51] Int. Cl.³ ............................................ B24B 41/00
[52] U.S. Cl. ........................................ 51/126; 51/99; 219/86.7; 228/45; 248/654; 409/235; 414/732
[58] Field of Search ................. 51/35, 98 R, 99, 125, 51/126, 147, 166 TS; 219/86.33, 86.7, 91.1, 125.1; 228/45; 248/653, 654; 409/235; 414/732, 733, 738

[56] References Cited

U.S. PATENT DOCUMENTS

| | | | |
|---|---|---|---|
| 1,137,647 | 4/1915 | McGuire | 51/99 |
| 1,325,789 | 12/1919 | Johnsson | 51/35 |
| 1,424,148 | 8/1922 | Billingsley | 51/99 |
| 1,692,997 | 11/1928 | Roberts | 51/126 X |
| 2,723,598 | 11/1955 | Mann | 51/99 X |
| 2,743,343 | 4/1956 | Anderson | 228/45 X |
| 3,255,893 | 6/1966 | Hainer et al. | 414/732 X |
| 3,709,423 | 1/1973 | Hano et al. | 228/45 X |
| 4,085,547 | 4/1978 | Lawson et al. | 51/99 X |

FOREIGN PATENT DOCUMENTS

| | | |
|---|---|---|
| 132346 | 10/1932 | Fed. Rep. of Germany ......... 51/99 |
| 2701151 | 7/1978 | Fed. Rep. of Germany . |
| 2717453 | 10/1978 | Fed. Rep. of Germany . |

Primary Examiner—Gary L. Smith
Assistant Examiner—Robert P. Olszewski
Attorney, Agent, or Firm—Karl F. Ross

[57] ABSTRACT

A tool positioner has a main support defining a pair of main pivot axes and including a guide. Respective main cranks have inner ends pivoted at the main pivot axes on a support and outer ends pivoted to ends of respective links whose other ends are pivoted on a tool holder. This holder has an elongated stem longitudinally displaceable in the guide and carries a tool which can pivot about the axis of the stem and about another axis perpendicular thereto. The two cranks can be displaced independently of each other for swinging of the tool holder about either of the main pivot axes or for displacing it along the axis of the stem.

13 Claims, 8 Drawing Figures

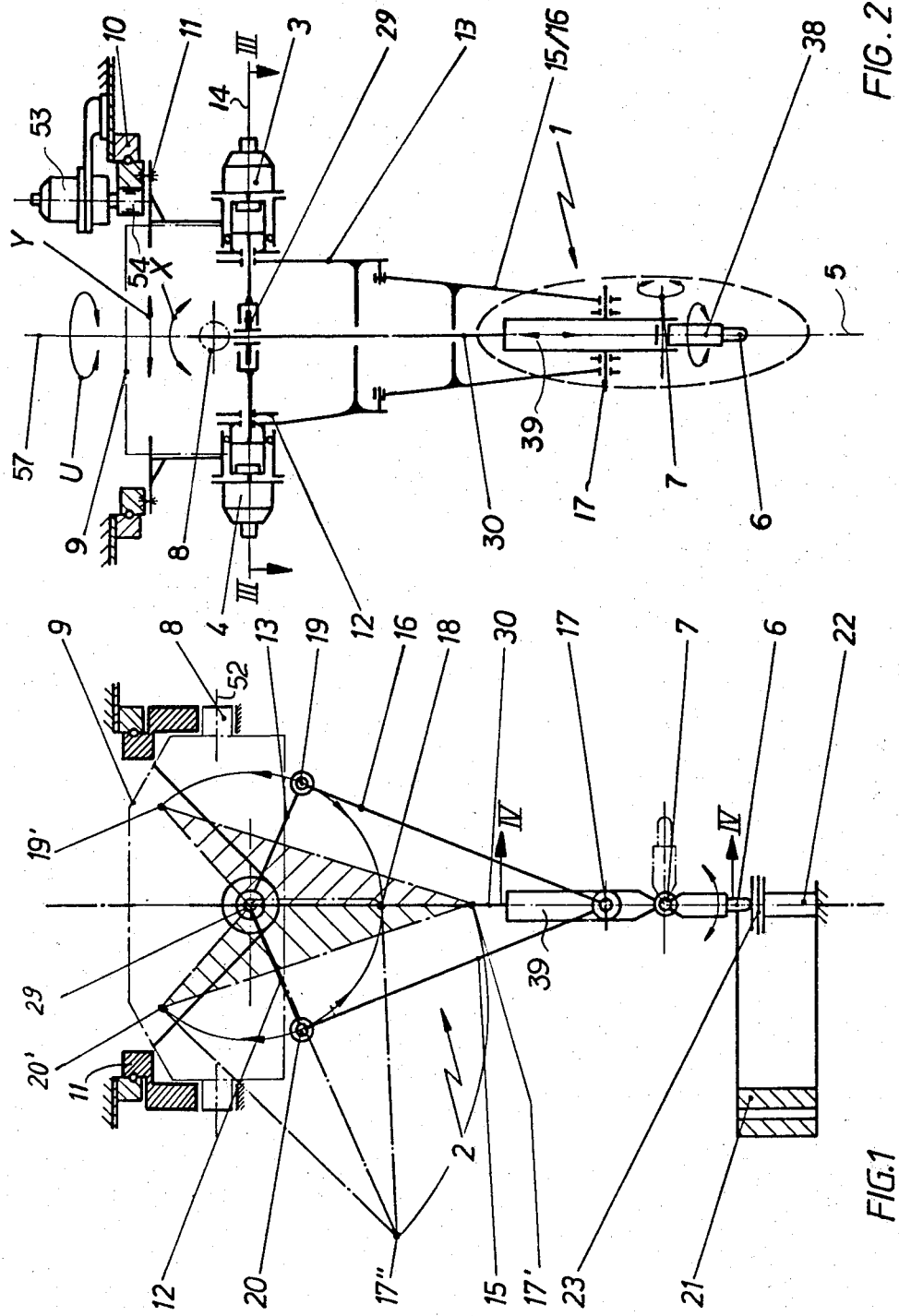

TOOL POSITIONER

FIELD OF THE INVENTION

The present invention relates to a tool positioner. More particularly this invention concerns a support assembly used to position a tool such as a spot welder on a workpiece, the assembly having several degrees of freedom of motion.

BACKGROUND OF THE INVENTION

It is frequently necessary to be able to move a tool such as a spot welder or grinder about in a limited space, with the ability of positioning the tool to attack a workpiece from virtually any direction. This is particularly the case at a station along an assembly line wherein, for example, motor-vehicle subassemblies are manufactured. Such a system is described in German Pat. No. 2,717,453 filed Apr. 20, 1977 by J. Slootz et al.

In such arrangements there are two principal requirements which typically are traded off against each other. On the one hand the device must be relatively light so as to be easily maneuverable; on the other hand the device must be capable of rigidly retaining the tool or workpiece once it is in position. Thus the user normally has a choice between a light and easy-to-handle system that does not rigidly position the tool or workpiece, and a heavy and cumbersome system that rigidly positions the tool or workpiece. Compromises employ force-amplifying cylinders and the like in heavy-duty systems in an attempt to make a massive arrangement operate as easily as a light arrangement. Such solutions are rarely effective, and in all cases are extremely expensive.

OBJECTS OF THE INVENTION

It is therefore an object of the present invention to provide an improved positioner.

Another object is to provide such a positioner which can be produced at relatively low cost, yet which nonetheless can maintain the tool or workpiece held by it relatively rigidly.

SUMMARY OF THE INVENTION

These objects are attained according to the instant invention in a positioner having a main support defining a pair of main pivot axes and carrying a guide. Respective main cranks have inner ends pivoted at the main pivot axes on the support and outer ends which are each pivoted to one end of a respective link whose other end is pivoted on a workpiece or tool holder. This holder in turn has an elongated stem longitudinally displaceable in the guide. Means such as motors or hydraulic cylinders is provided for pivoting the main cranks on the main support about the respective main pivot axis.

According to further features of this invention the guide is an eye through which extends the stem of the tool or workpiece holder. This eye can be simply fixed on the main support, normally in the region of the main pivot axis, or may be mounted on a pair of arms which maintain it on a bisector of the angle formed by the two links.

With this system it is therefore possible by providing a separate pivoting means for the main cranks to effect many motions in the desired degree of freedom in a relatively simple manner. When the cranks are rotated jointly in the same direction the holder will move through an arc. When the two cranks are moved at the same rate in opposite angular directions they will move the holder either toward or away from their axes, but will not pivot the holder at all. Combinations of these two forms of motion allow full motion with two degrees of freedom. In this arrangement it is possible for the main axes to coincide and, in effect, be a single axis, or to symmetrically flank the guide.

According to further features of this invention the holder is provided with separate means for defining a pair of perpendicular axes, one extending through the holder and along the longitudinal axis of the stem of the holder and the other extending through the holder adjacent and perpendicular to the first axis. The tool is displaceable by respective drives on the holder about both of these axes so that the tool can be positioned virtually at any orientation relative to a given workpiece.

It is also within the scope of this invention to make the entire main support pivotal about an axis, normally upright, which extends through the guide, and if necessary to make it possible to provide tracks for the main support for displacement in one or two horizontal directions on guides relative to the main-support axis.

BRIEF DESCRIPTION OF THE DRAWING

FIG. 1 is a largely schematic end view of a positioner according to this invention;

FIG. 2 is a side view of the positioner of FIG. 1;

SPECIFIC DESCRIPTION

Figure 3:
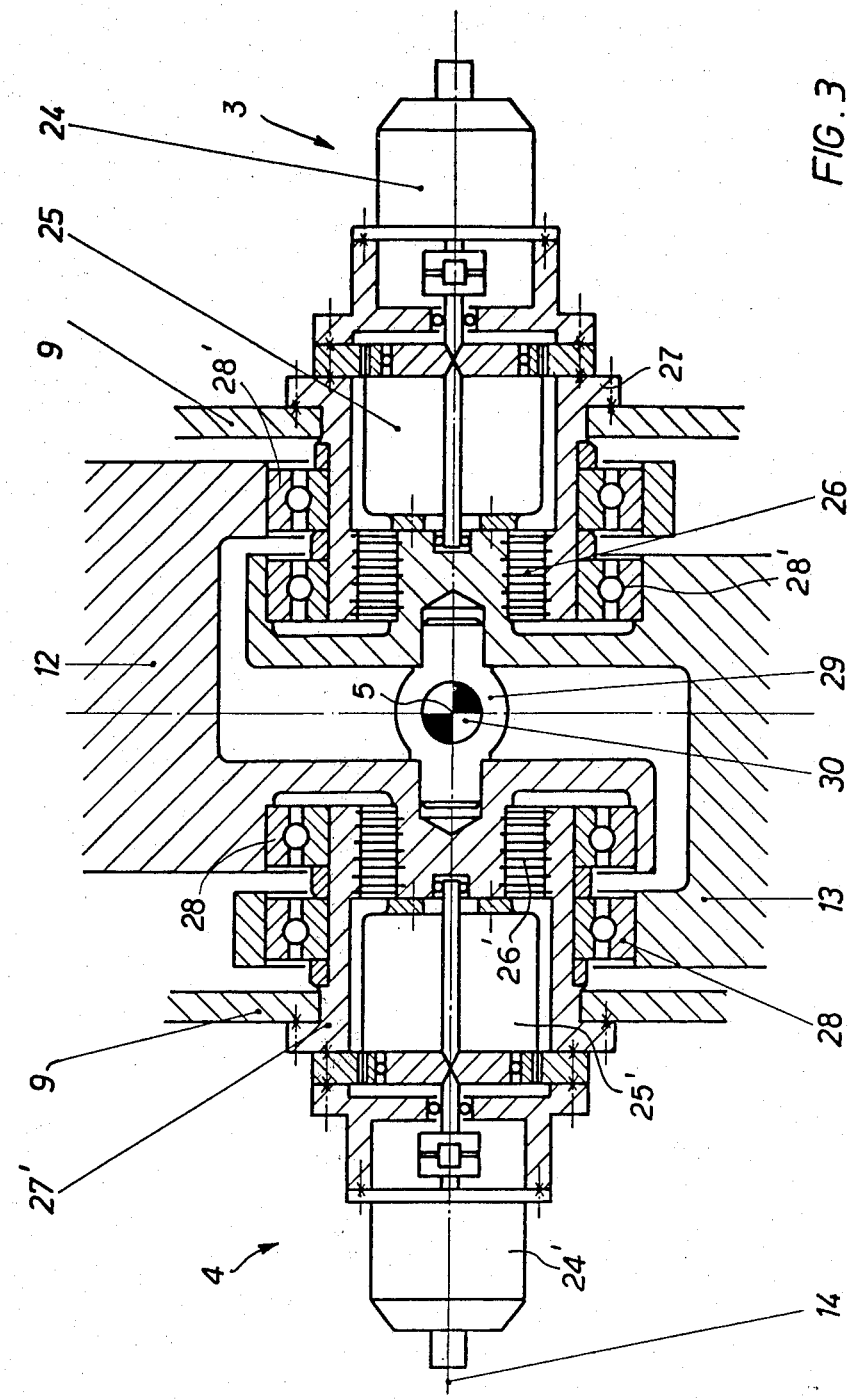
FIGS. 3 and 4 are sections taken respectively along lines III—III and IV—IV of FIGS. 2 and 1.

As shown in FIGS. 1-4 a positioner according to the instant invention has a main support 9 pivotal about a horizontal axis 52 on gudgeons 8 suspended from a toothed ring 11 rotatable within a fixed ring 10. A pinion 54 rotatable about an upright axis by a motor 53 meshes with the teeth of the ring 11 to rotate the entire main support 9 about a vertical axis 57 perpendicular to the horizontal axis 52. Thus operation of the motor 53 can rotate the entire main support about the vertical axis 57 as indicated by arrow U and a similar motor arrangement can pivot the entire main support 9 about the axis 52 as indicated by arrow X. What is more it is possible to provide, as is known in the art, means for displacing the entire main support 9 along the axis 52 as indicated by arrow Y.

The main support 9 carries a guide 29 through which passes a stem 30 defining an axis 5 which can coincide with the axis 57, but which always passes through the double-pin eye forming the guide 29. This stem 30 extends backwardly from a tool holder 39 itself operable by means of a drive assembly 1 for displacement of a tool 6 and tool cylinder 38 about the axis 14 and about an axis 7 perpendicular to the axis 14. Furthermore an upper drive assembly 2 is provided having a pair of subassemblies 3 and 4 for displacing the tool holder 39 longitudinally along the axis 5 and about a horizontal axis 14 passing through the guide eye 29.

More particularly and as also shown in FIG. 3, the main frame 9 defines the pivot axis 14 for a pair of cranks 12 and 13 having outer ends 19 and 20 pivoted on the upper ends of links 15 and 16 whose lower ends are jointly pivoted at 17 on the tool holder 39.

Figure 4:
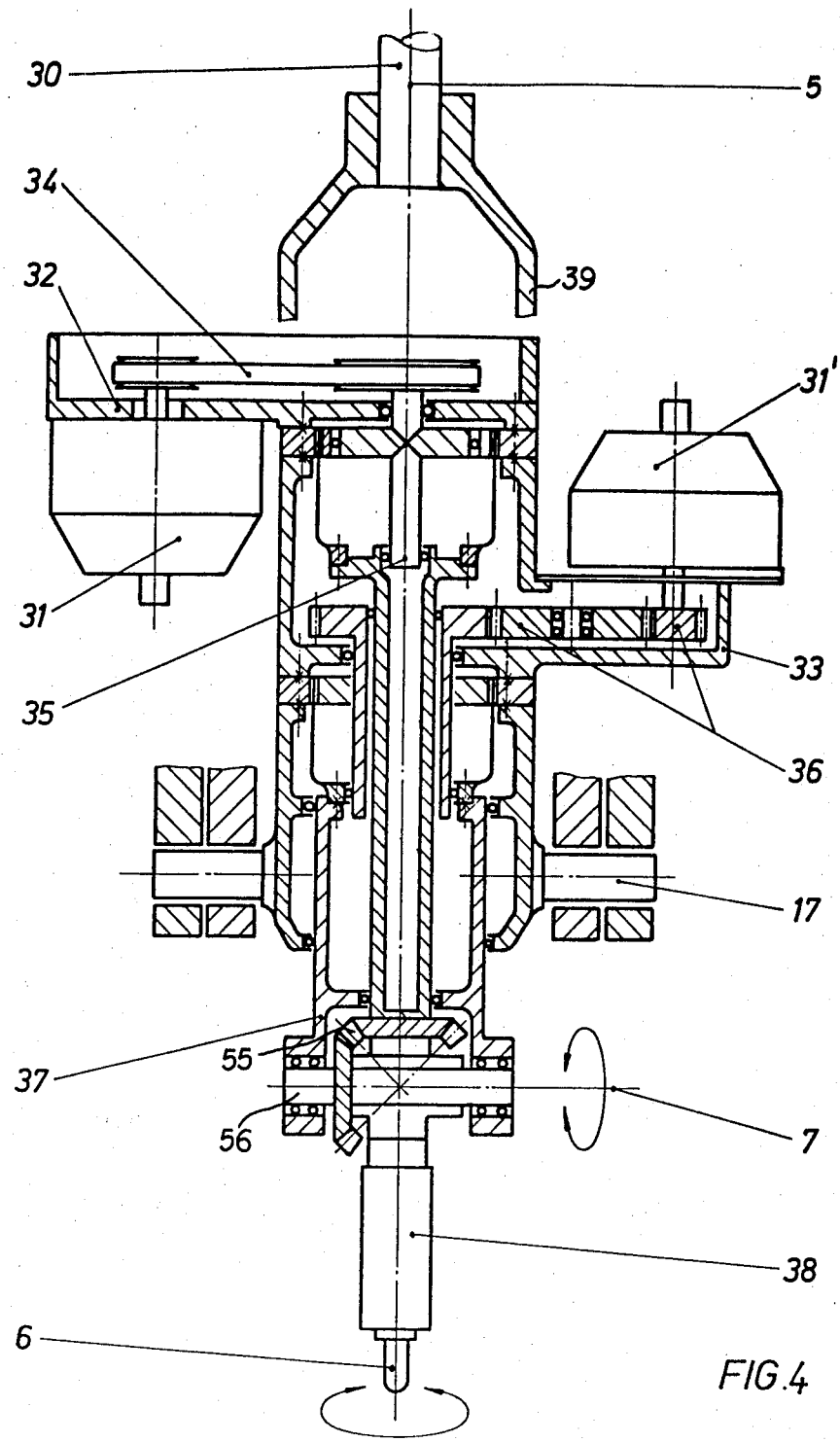

As best seen in FIG. 3 the cranks 12 and 13 are supported on respective roller bearings 28 and 28' on mounting sleeves 27 and 27' centered on the axis 14 and fixed on the main support 9. Electrical motors 24 and 24' are effective through respective transmissions 25 and 25' on the arms 13 and 12, respectively. In addition brakes 26 and 26' can arrest these arms 12 and 13 against rotation about the axis 14. Each of the motors 24 and 24' is of the stepping type and has a position detector connected to the main controller of the arrangement. Similarly as shown in FIG. 4 the tool 6, here a spot-welding tool, can be displaced about the orthogonal axes 5 and 7 by respective motors 31 and 31' identical to the motors 24 and 24'. The motor 31 is carried on an outrigger support 32 and is effective through a belt 34 on a shaft 35 that engages the tool 6 by means of bevel gearing 55 to turn it about the axis 7 on gudgeons 56. The motor 31' is carried on an outrigger support 33 and engages a sleeve 37 by means of a step-down gearing 36 to rotate the entire tool 6 about the axis 5. These motors 31 and 31' are similarly coupled to the master controller for the positioner according to this invention.

Thus as seen in FIG. 1, it is possible to move the tool 39 along the axis 5 by rotating the two cranks 12 and 13 at the same rate but in opposite directions. When rotated upwardly toward each other to move the pivots 19 and 20 into the positions indicated at 19' and 20', the pivots 17 will be moved correspondingly up to the position indicated at 17'.

Similarly the tool holder 39 can be pivoted about the axis 14. Thus if the one pivot 20 of the crank 12 is moved into the position 12' and the other pivot 19 is moved into the position indicated at 18, the lower pivot 17 will be moved into the position indicated at 17". Obviously these various motions can be combined to displace the tool 39 through a wide range with two complete degrees of freedom.

Another degree of freedom is obtainable by pivoting support 9 about the axis 52 and/or about and/or along the axis 57, as described above. Similarly the tool 6 itself can be pivoted about the axis 7 or about the axis 5 to assume virtually any angle of attack on a given workpiece.

A workpiece is here shown to be several plates 23 connected to a transformer 21 and supported on a stand 22. The various cooling connections and electrical-supply connections can all be made in a manner well known in the art.

Figure 5:
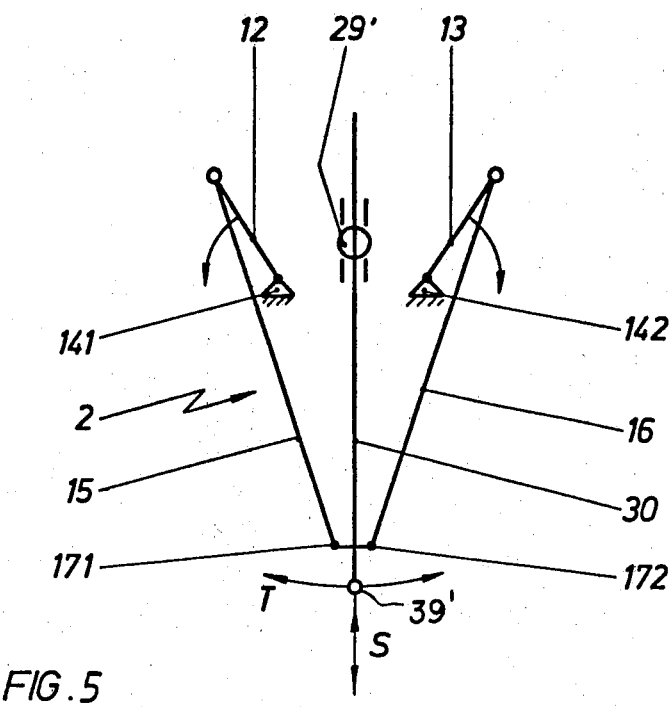
FIGS. 5 and 6 are end schematic views of further systems according to this invention.

FIG. 5 shows a system wherein the two links 12 and 13 are not pivoted about a common axis 14, but about respective axes 141 and 142 symmetrically flanking the stem 30 which is received within a guide 29'. What is more the lower end of the links 15 and 16 are secured at pivots 171 and 172 that flank the stem 30. Thus synchronous opposite angular displacement of the links 12 and 13 will move the tool holder indicated at 39' in the direction of arrow S and nonsynchronous movement will swing it as shown by arrow T.

Figure 6:
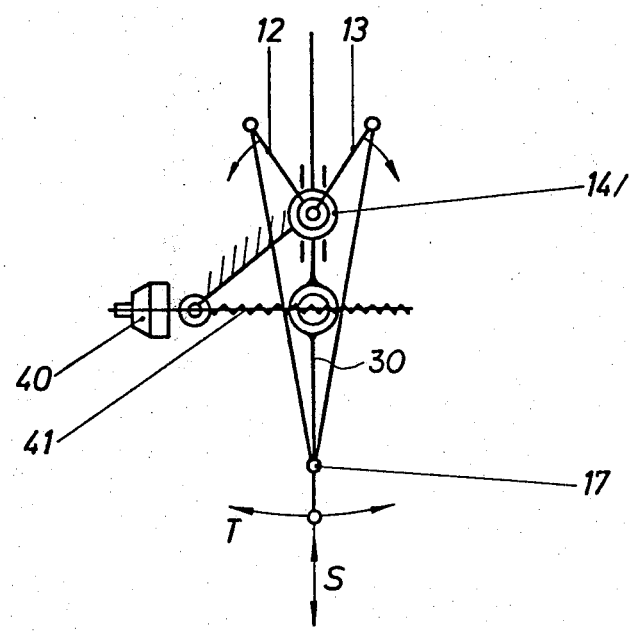

FIG. 6 shows an arrangement wherein gearing is provided to automatically oppositely and synchronously counterrotate the two links 12 and 13 which are pivoted about the axis 14, as shown in FIG. 1. Thus pivoting of the cranks 12 and 13 can only effect displacement in the direction S. Swinging in the directions of arrow T is effected by a motor 40 having a spindle 41 threadedly engaging the stem 30.

Figure 7:
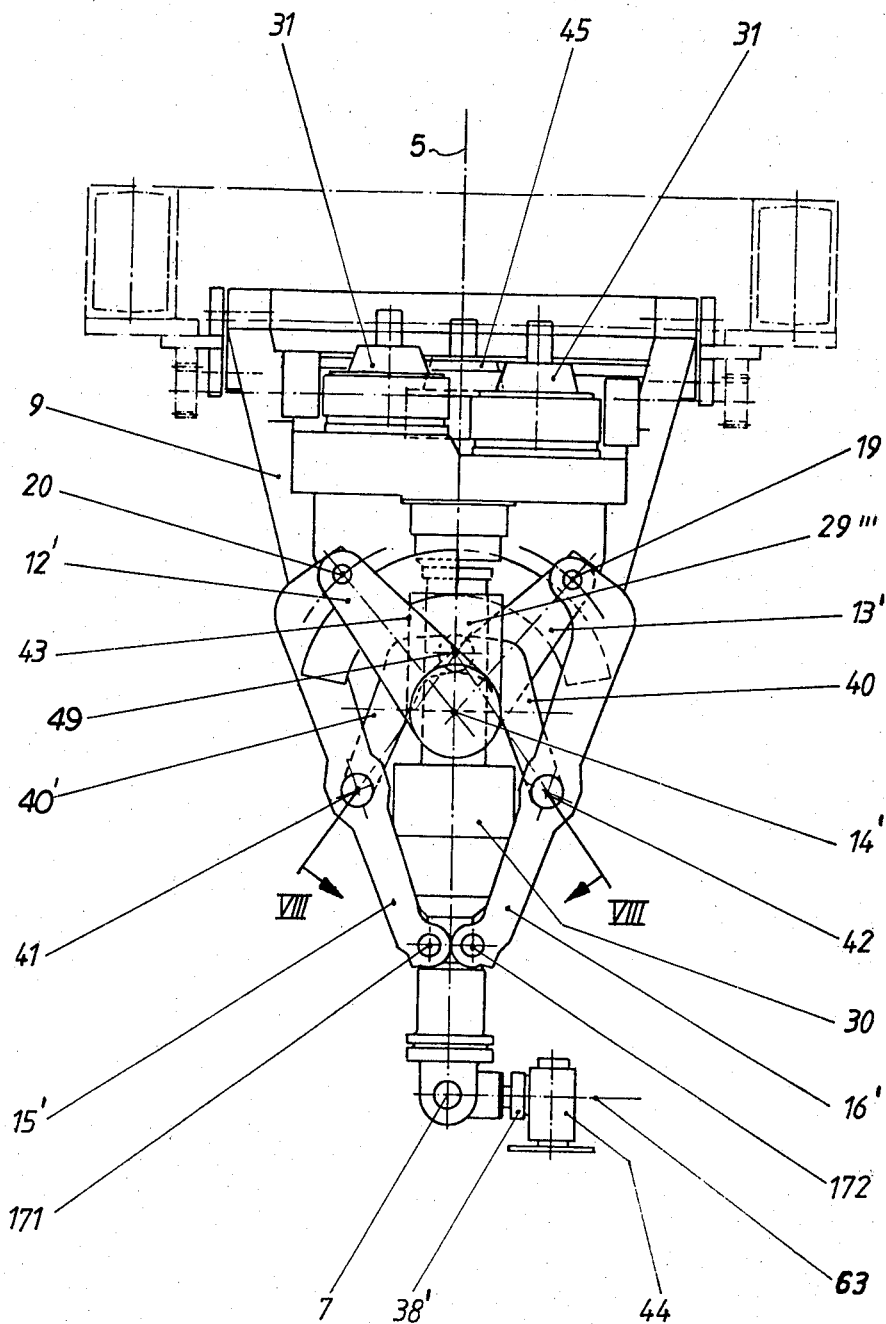
FIG. 7 is a side view of yet another system according to this invention.
Figure 8:
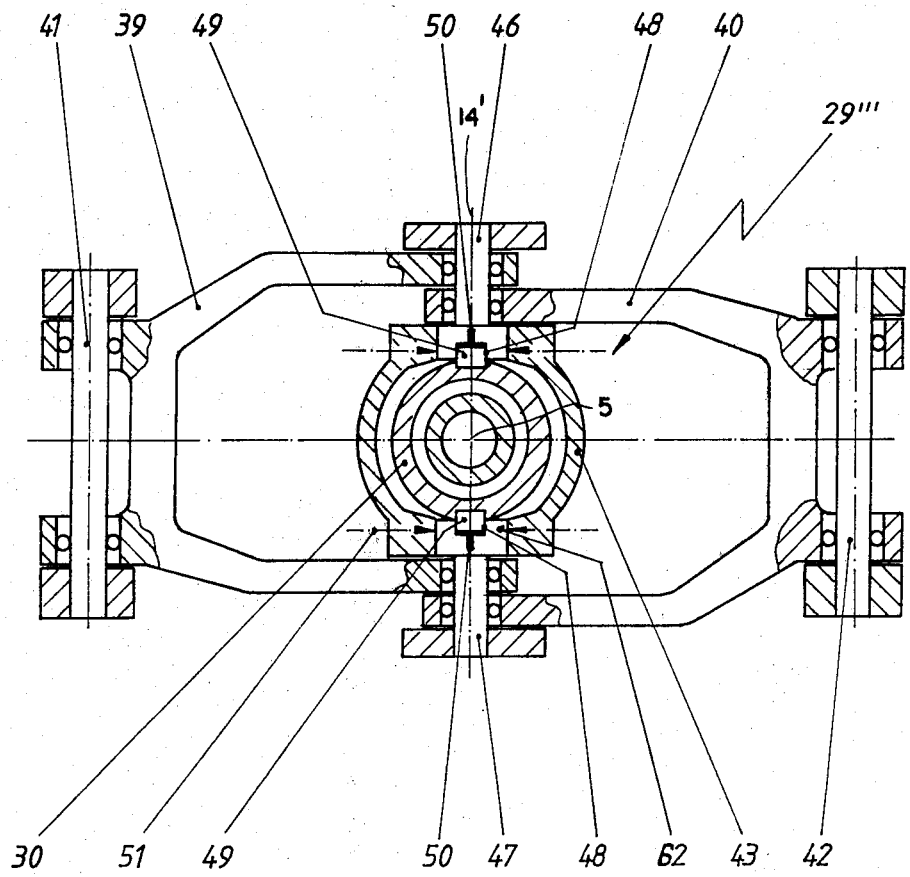
FIG. 8 is a section taken along VIII—VIII of FIG. 7.

Finally, FIGS. 7 and 8 show another system which is particularly designed for compactness. Reference numerals identical to those other figures represent functionally, if not structurally, identical elements.

Here two cranks 12' and 13' are relatively short but pivoted about a common axis 14' as shown in FIGS. 1-4. A tubular guide 29'" is carried on a pair of arms 40 and 40' pivoted at 41 and 42 on links 15' and 16' which are L-shaped. Thus this guide sleeve 29'" will remain on a bisector of the angle formed by these two links 15' and 16' which are pivoted at offset locations 171 and 172 as illustrated for FIG. 5. In this arrangement the welding cylinder 38 is replaced by a mount 38' for a grinder 44 that is also pivotal about an axis 63 perpendicular about the axis 7. Various drive motors 31 are mounted well above the assembly and a drive motor 45 serves for pivoting of the grinder 44 about the axis 63.

As shown in FIG. 8 the guide 29'" actually comprises a sleeve 43 loosely receiving the tubular stem 30 which itself is provided with a pair of square-section ridges 49 received in grooves 48 formed between members 62 separated by a split 50 and which may be brought to bear tightly on the rails 49 by adjustment screws 51. These members 62 are carried on pivot pins 46 defining the axis 14' for the system. Thus the interaction of these guide rails 49 and the grooves 48 ensures longitudinal guiding of the stem 30 along the axis 5.

I claim:

1. A positioner comprising:
   a main support defining a pair of main pivot axes and carrying a guide;
   respective main cranks having inner ends pivoted at said main pivot axes on said support and outer ends;
   respective links having respective one ends pivoted on said outer ends of said cranks and having other ends;
   a holder pivoted on said other ends of said links and having an elongated stem longitudinally displaceable in said guide; and
   respective means for pivoting said main cranks on said main support about the respective main pivot axes.

2. The positioner defined in claim 1 wherein said main axis are closely adjacent said guide.

3. The positioner defined in claim 2 wherein said stem defines a longitudinal axis generally angularly equispaced between said links.

4. The positioner defined in claim 3 wherein said guide is fixed on said support.

5. The positioner defined in claim 4 wherein said main axes coincide and said guide is an eye surrounding said stem and lying on said main axes.

6. The positioner defined in claim 1, further comprising brake means for inhibiting rotation of said cranks about said main axes.

7. The positioner defined in claim 1, further comprising
   a tool on said holder;
   means on said holder for pivoting said tool on said holder about a first axis passing through said holder; and
   means on said holder for pivoting said tool on said holder about a second axis transverse to said first axis and passing through said holder.

8. The positioner defined in claim 1 wherein said main axis generally symmetrically flank said guide.

9. The positioner defined in claim 1, further comprising means for pivoting said holder about an axis passing through said guide.

10. The positioner defined in claim 1 further comprising means fixed on said links and connected via said links and said cranks with said support for displacement of said guide along an axis fixed with respect to said support and halving the angle between the links.

11. The positioner defined in claim 1 wherein said guide and said stem include longitudinally extending and interfitting guide formations for sliding of said stem longitudinally in said guide.

12. The positioner defined in claim 1 wherein said links are L-shaped and concave toward each other.

13. The positioner defined in claim 1 wherein said means for pivoting said main cranks operate independently of each other and can each pivot the respective crank in either angular direction.

* * * * *